United States Patent [19]

Vassalotti

[11] Patent Number: 4,470,952
[45] Date of Patent: Sep. 11, 1984

[54] FLOATING DECONTAMINATION APPARATUS

[75] Inventor: Michael Vassalotti, New Milford, Conn.

[73] Assignee: Automation Industries, Inc., Greenwich, Conn.

[21] Appl. No.: 388,243

[22] Filed: Jun. 14, 1982

[51] Int. Cl.³ .............................................. G21C 19/20
[52] U.S. Cl. ..................................... 376/316; 376/310; 376/309; 376/249; 134/167 R
[58] Field of Search ............... 376/308, 309, 310, 316, 376/249, 260, 463; 134/166 R, 167 R, 168 R, 181, 148, 144, 22.18, 23, 24, 199; 440/38

[56] References Cited

U.S. PATENT DOCUMENTS

| | | | |
|---|---|---|---|
| 3,315,691 | 4/1967 | Widner | 134/181 X |
| 3,837,011 | 9/1974 | McTighe et al. | 134/168 R X |
| 3,985,572 | 10/1976 | Petermann et al. | 134/167 R X |
| 4,017,331 | 4/1977 | Thoden, Sr. | 134/167 R |
| 4,069,923 | 1/1978 | Blumenau et al. | 376/260 |
| 4,087,296 | 5/1978 | Hooker | 156/71 |
| 4,219,976 | 9/1980 | Burack et al. | 134/167 R X |
| 4,259,910 | 4/1981 | Warren et al. | 110/211 |
| 4,281,995 | 8/1981 | Pansini | 134/167 R X |
| 4,376,443 | 3/1983 | Mondy, Jr. | 134/168 R |

FOREIGN PATENT DOCUMENTS 0159599 12/1979 Japan .................................. 376/463

Primary Examiner—Richard E. Schafer
Assistant Examiner—Daniel Wasil
Attorney, Agent, or Firm—Francis N. Carten

[57] ABSTRACT

Apparatus is disclosed for decontaminating a nuclear reactor pressure vessel. It comprises a buoyant annular frame which descends into the vessel as the water level within it is lowered. Spray nozzles move around the frame on trolleys in a reciprocating fashion and spray water under high pressure on the inner surface of the vessel wall, resulting in automatic washdown of the reactor vessel.

5 Claims, 9 Drawing Figures

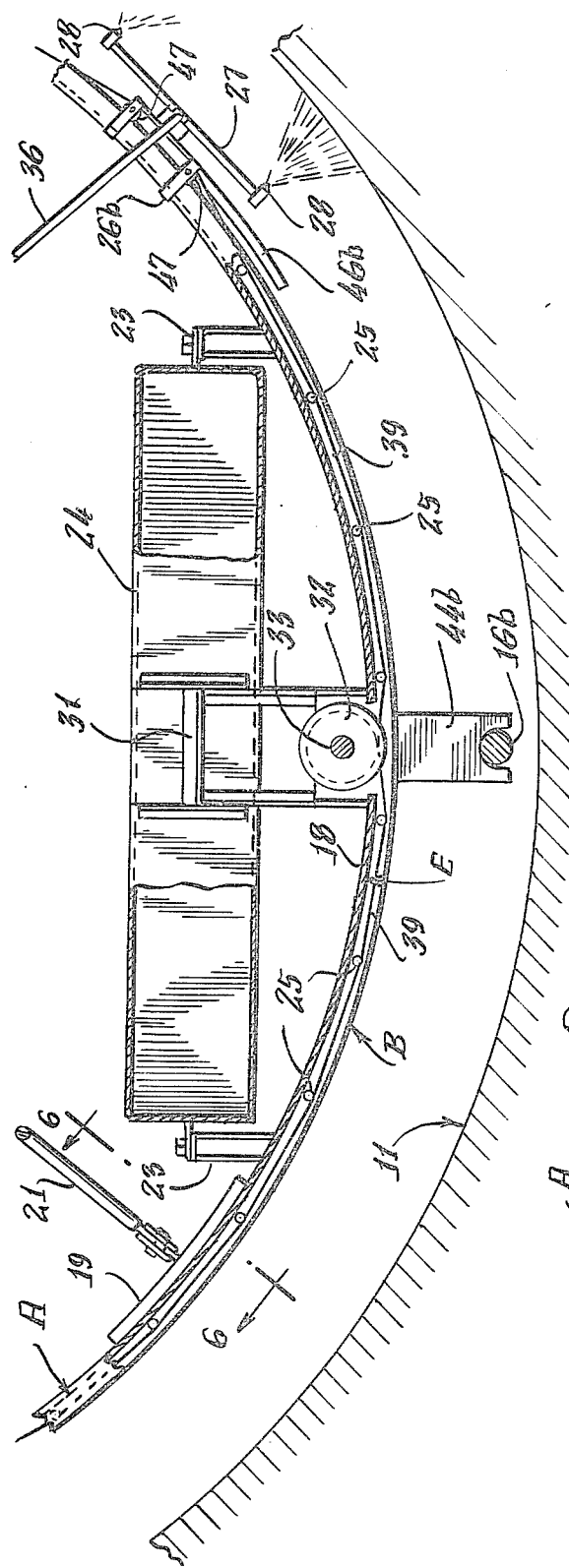
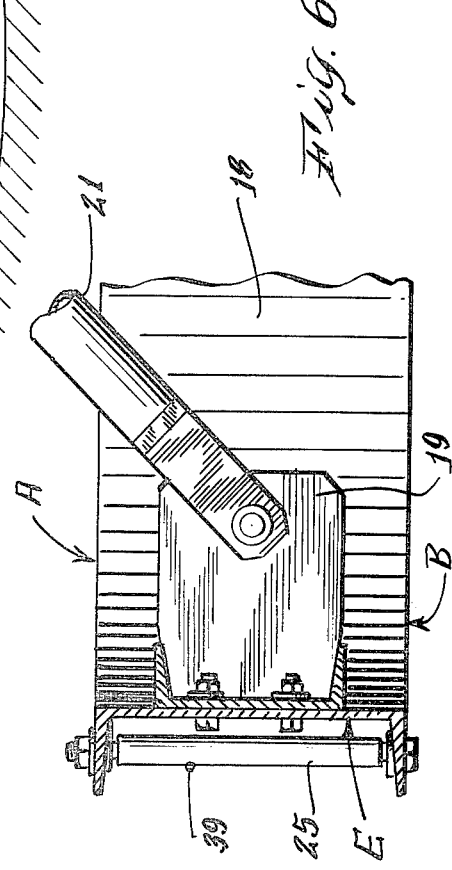

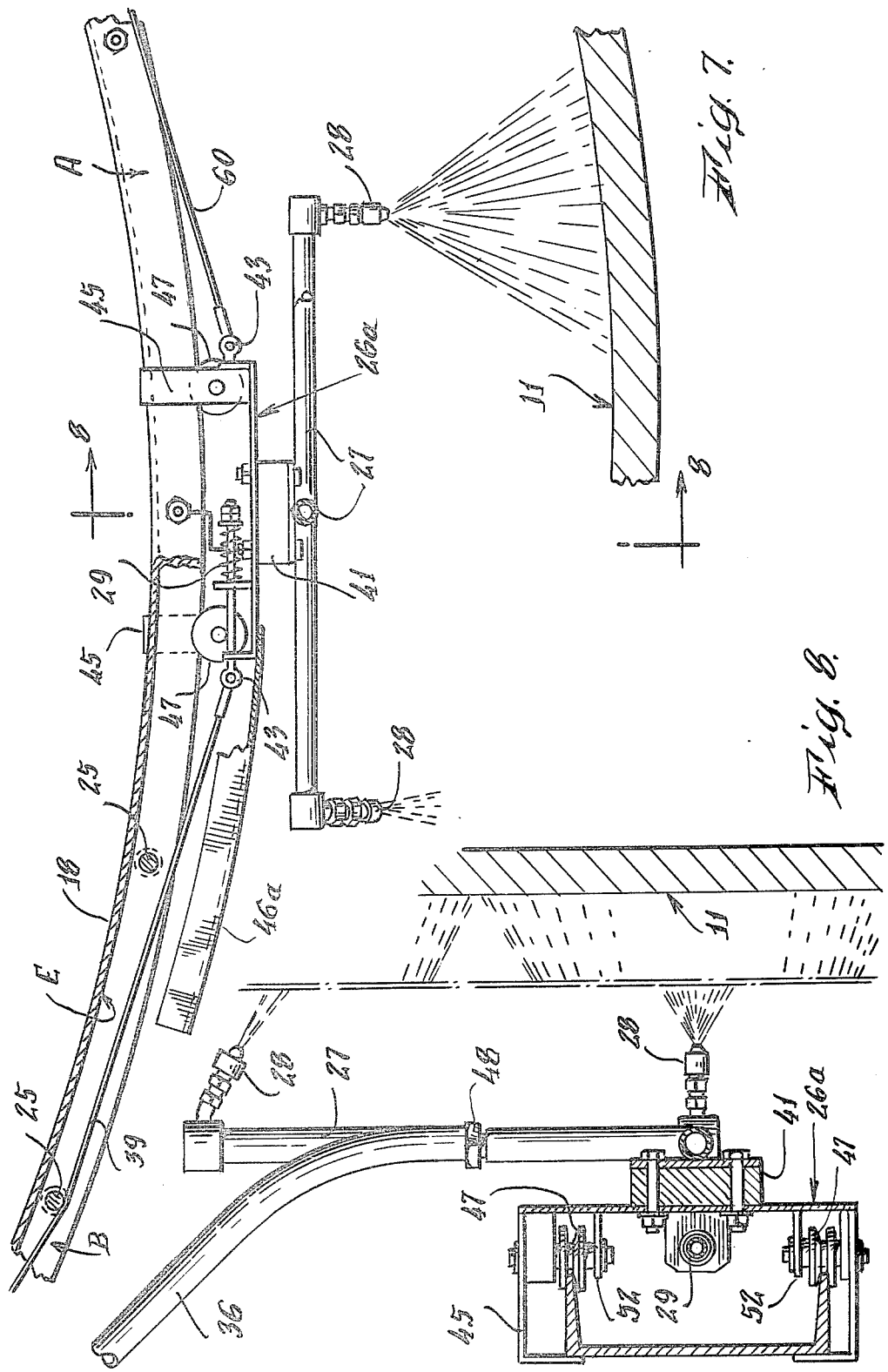

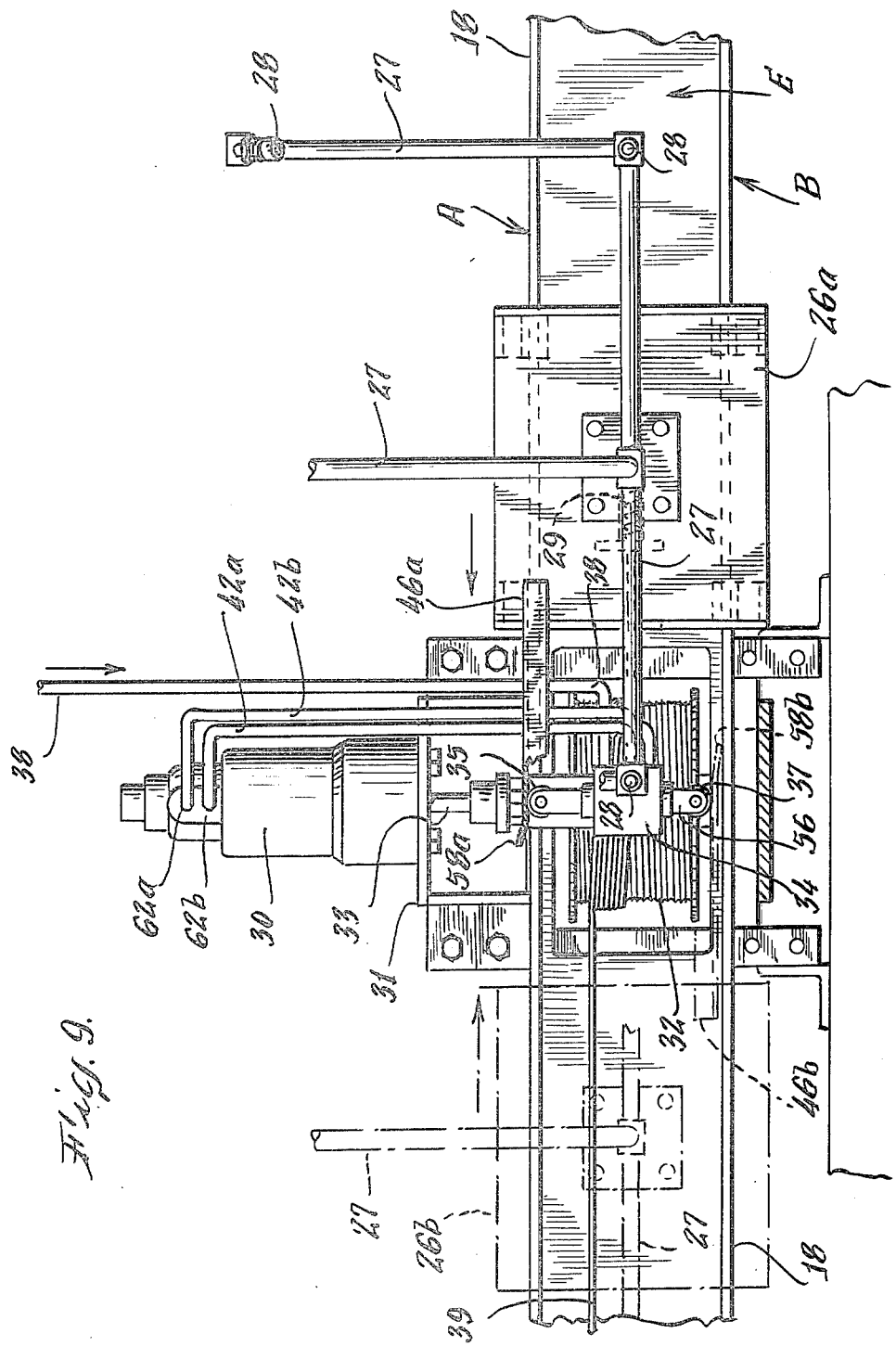

FLOATING DECONTAMINATION APPARATUS

TECHNICAL FIELD

This invention pertains to nuclear reactors. More particularly, it comprises apparatus for decontaminating the interior wall of the containment vessel of a boiling water reactor during shutdown periods.

BACKGROUND ART

One of the operations which must normally be performed during the outage of a nuclear boiling water reactor is the decontamination of the reactor pressure vessel. This is considered to be a "critical path" operation as opposed to a "collateral" operation. In other words, it is an operation which must be performed before the succeeding operation can be undertaken and, thus, adds directly to the length of the shutdown period.

Once the head has been removed from the reactor vessel, it is essentially an open top cylindrical tank which may be on the order of twenty feet in diameter. Decontamination is achieved by spraying high pressure water on the walls of the vessel. The manner in which this is conventionally achieved is by lowering a man into the vessel in a container suspended from a crane. He then proceeds to wash down the inner wall with a high pressure hose. It is desirable to use very high pressure water for this purpose, for example, up to 10,000 psi. However, the high reaction forces acting upon the container at the end of a relatively long cable, cause the container and workman to be bounced from side to side within the reactor vessel. The man, even though wearing protective gear, is exposed to highly contaminated water droplets in a highly radioactive environment. The radioactivity, coupled with the sheer physical stress, makes this a very difficult and undesirable job.

Because of the reaction forces, it is usually necessary to reduce the water pressure below its optimum value. As a result, the decontamination period is substantially increased and may be, for example, on the order of eight hours. As reactor shutdowns are very costly, it would be desirable to shorten the time for decontamination. It would also, of course, be desirable to reduce or eliminate the exposure of personnel to the dangerous and stress inducing features of the conventional decontamination washdown.

One approach to the problem of reactor vessel decontamination is disclosed in a copending U.S. application, Ser. No. 208,690, filed Nov. 20, 1980 of Michael Vassalotti for "Decontamination Apparatus for Nuclear Reactor Pressure Vessel" which has been assigned to the same assignee as the present invention. Although that solution to the decontamination problem has proved itself highly successful, it requires the concomitant use of an equipment crane during its operation. The present invention frees the reactor crane for other work and can accomplish the same task more efficiently.

DISCLOSURE OF INVENTION

In accordance with the invention, apparatus is provided for decontaminating a substantially cylindrical nuclear reactor pressure vessel having its head removed to thereby present an open top. The apparatus comprises a buoyant annular frame and decontamination means which spray water under high pressure on the inner wall of the vessel while the water level within the vessel is lowered. Nozzles positioned to direct water against the inner wall of the vessel are carried around the frame in a reciprocating fashion by trolleys. The trolleys are controlled and driven by air motor and valve means. Additional means are provided for supplying pressurized water to the nozzles and pressurized air to the air motor and air valve. Means are also provided for automatically terminating the decontamination operation once the apparatus reaches a predetermined position within the vessel.

BRIEF DESCRIPTION OF THE DRAWINGS

FIG. 5 is an enlarged partial top view of the decontamination apparatus shown in FIG. 1;

FIG. 6 is an enlarged partial cross-sectional view taken substantially along line 6—6 of FIG. 5;

FIG. 7 is an enlarged partial top view of the decontamination apparatus shown in FIG. 5 which illustrates the carriage and nozzle components of the invention;

FIG. 8 is an enlarged cross-sectional view taken substantially along line 8—8 of FIG. 7; and FIG. 9 is an enlarged view of a portion of the decontamination apparatus shown in FIG. 3.

BEST MODE FOR CARRYING OUT THE INVENTION

Figure 1:
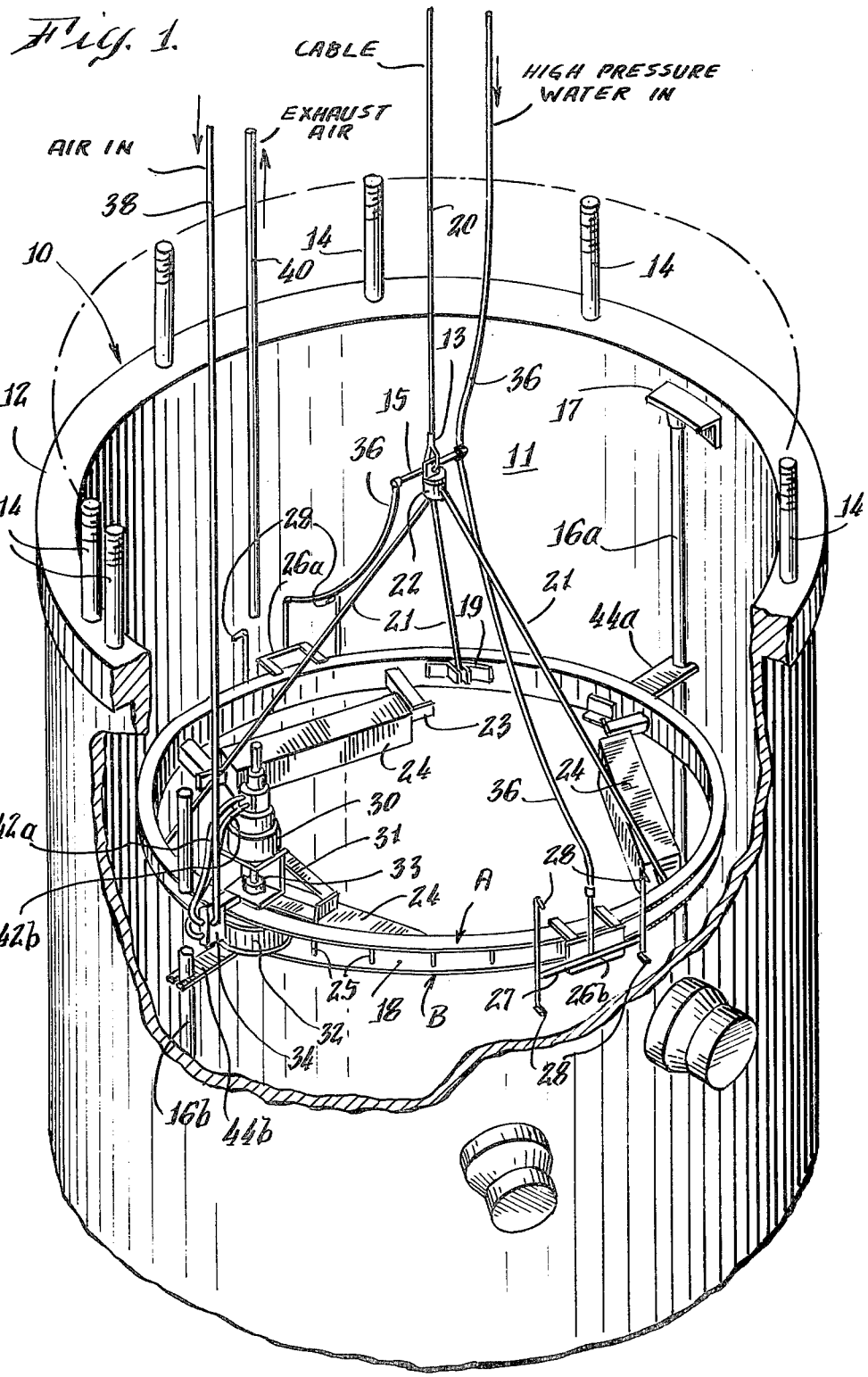
FIG. 1 is a perspective view of a boiling water reactor pressure vessel, partially broken away to reveal the decontamination apparatus of this invention.

FIG. 1 illustrates a reactor pressure vessel 10. The head of the vessel is removed revealing its interior wall surface 11 and an open upper edge surrounded by a flange 12. Threaded studs 14 for securing the head extend upwardly from the flange 12. Many of the studs 14 are omitted for ease of illustration. Mounted at diametrically opposed locations within the vessel 10 and closely adjacent to its inner wall are a pair of vertical guide rods 16a, b mouted on the inner wall by guide rod brackets 17a, b. Normally these rods are employed for positioning components as they are lowered into the reactor vessel 10.

Figure 2:
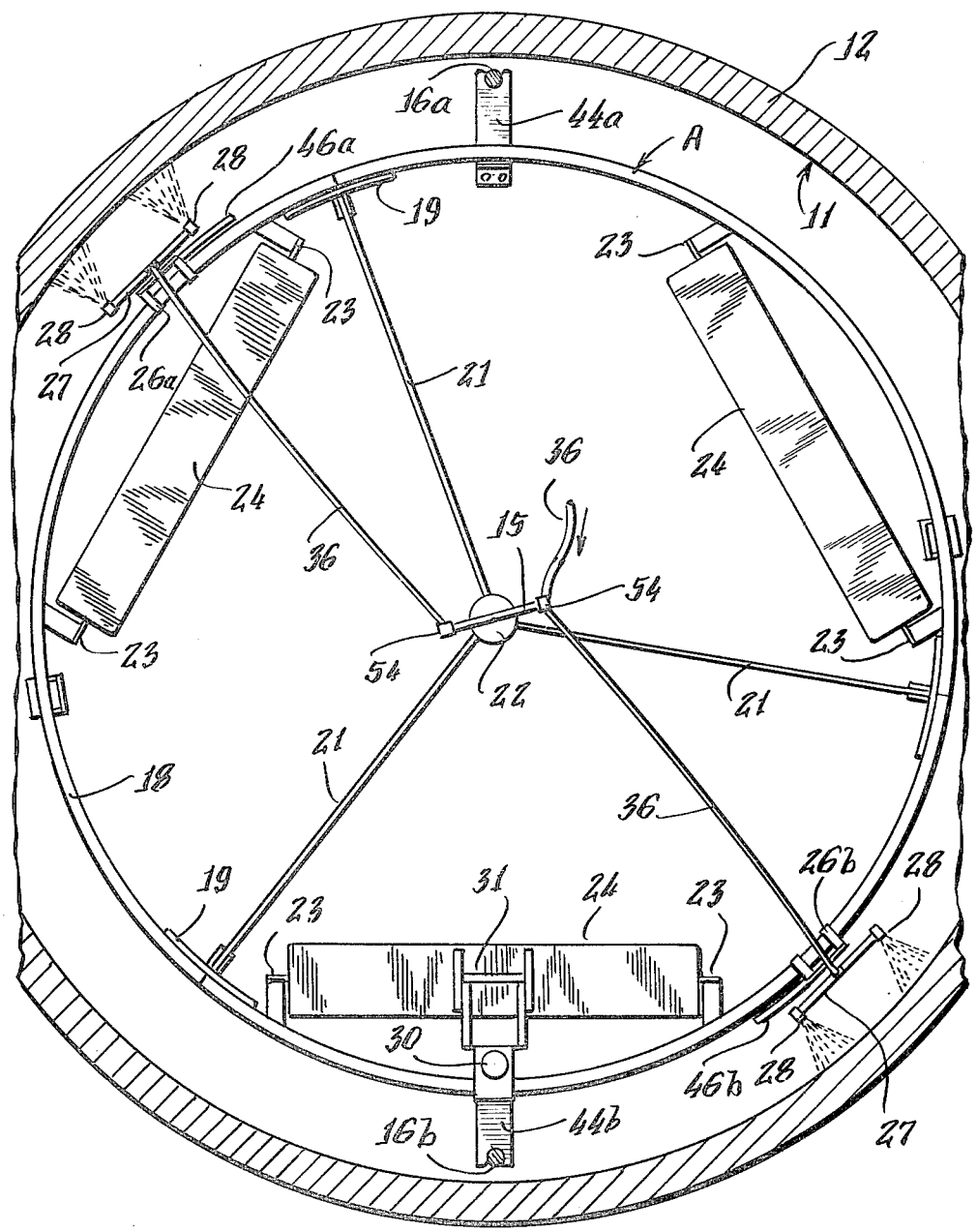
FIG. 2 is a top partial view of the pressure vessel and decontamination apparatus of FIG. 1.

As shown in FIGS. 1 and 2, a buoyant annular frame comprised of a curved channel iron 18 having top and bottom flanges A and B has a plurality of floats 24 connected to it by float brackets 23. A crane (not shown) lowers the frame 18 into the reactor pressure vessel 10 by means of a support cable 20 connected to a lifting lug 13 secured to a plurality of lifting legs 21 by lifting leg yoke 22. The lifting legs 21 are coupled to the curved channel iron 18 by brackets 19.

A pair of trolleys 26a and 26b are movably mounted on the curved channel iron 18 and carry nozzle manifolds 27 bearing a plurality of nozzles 28 for directing water under high pressure at the interior wall surface 11. Water under pressure is conducted from a remote source to the nozzle manifolds 27 by water supply line manifold 15 and water supply lines 36.

Figure 4:
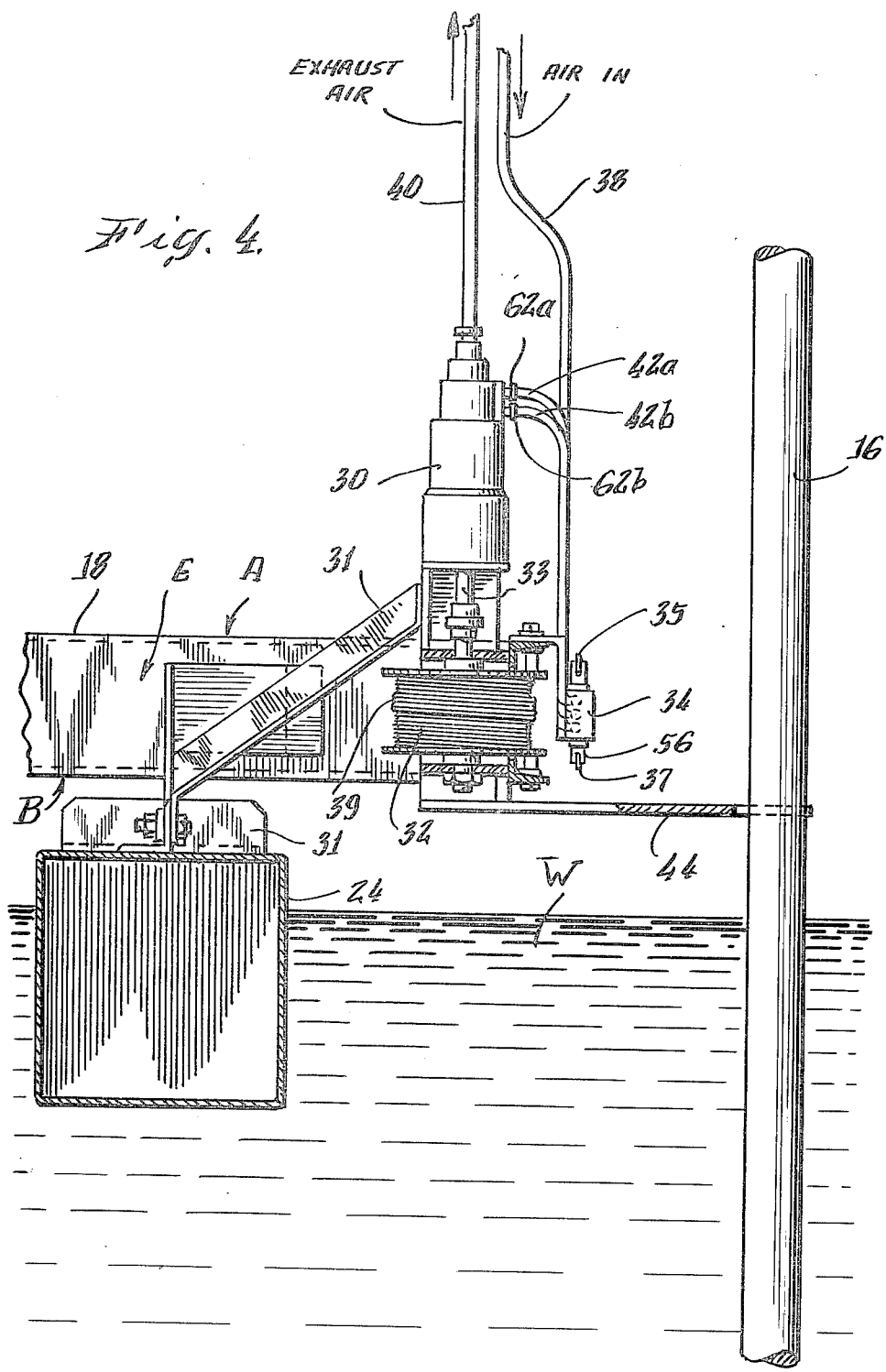
FIG. 4 is an enlarged partial cross-sectional view taken substantially along line 4—4 of FIG. 3.

As best shown in FIG. 4, a reversible air motor 30 is mounted atop an air motor bracket 31 which is affixed to one of the floats 24 which float upon the water W in the vessel. Compressed air is conveyed to the air motor 30 by an air supply line 38 and via an air valve 34, a pair of air valve connection lines 42a, b and intake ports 62a, b. Spent air is exhausted from the motor 30 through exhaust line 40. A flexible coupling 33 extends from the air motor 30 to a grooved drum 32 which is situated between the top surface A and the lower surface B of the curved channel iron 18.

Guide plates 44a, b (FIGS. 1 and 4) connected to curved channel iron 18 extend radially outward from the curved channel iron and engage vertical guide rods 16a, b mounted on the interior wall of the vessel by brackets 17.

Figure 3:
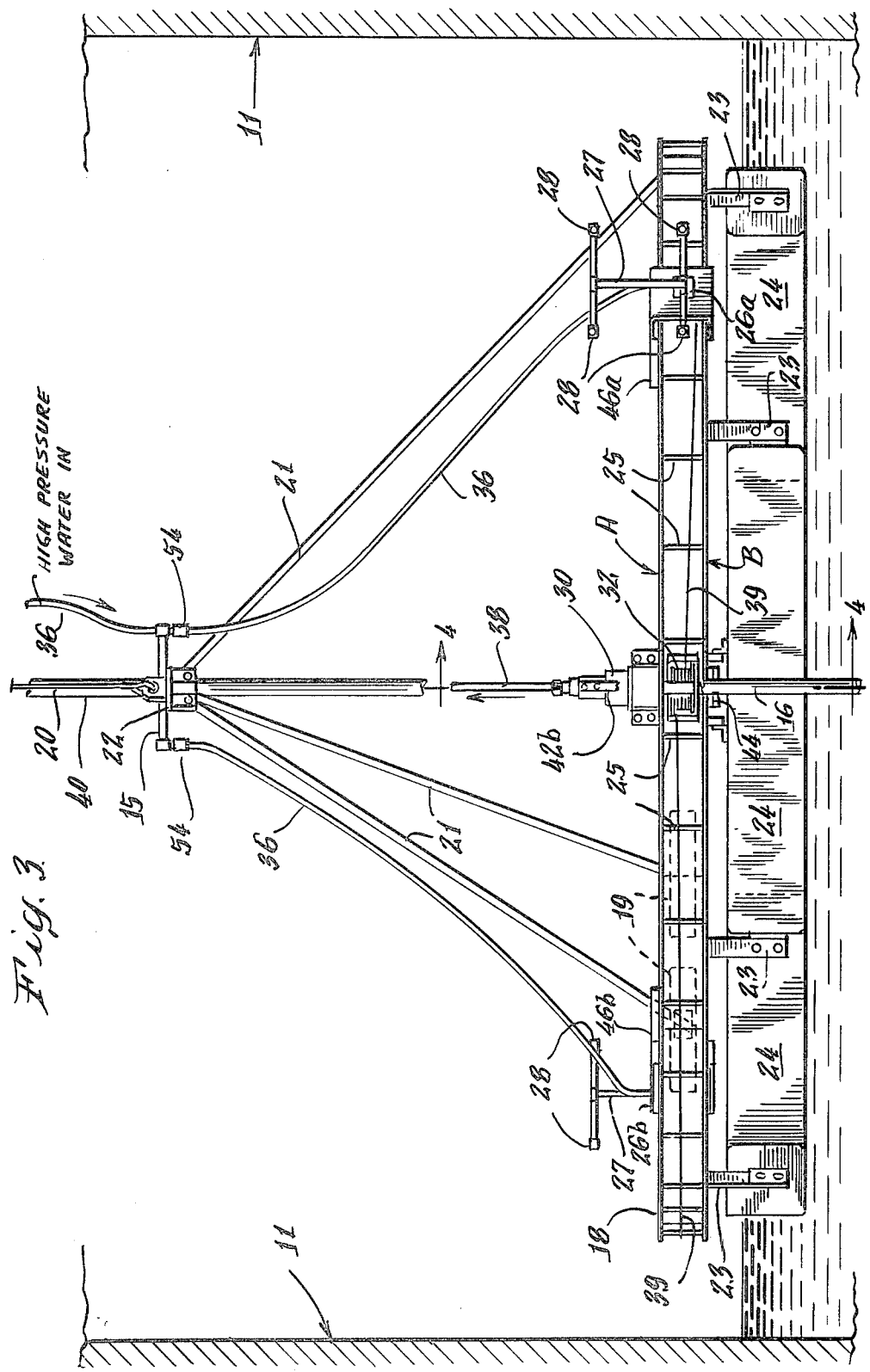
FIG. 3 is a side view of the decontamination apparatus shown in FIG. 1.

FIG. 3 further illustrates the support cable 20 which passes through the eye of lifting lug 13. The lifting lug 13 is coupled to yoke 22 which bears the water supply line manifold 15. The manifold 15 is connected to the water supply lines 36 by quick disconnect couplings 54 for ease of assembly and disassembly. FIG. 3 also shows first drive cable 39 which passes around a portion of the circumference of the curved channel iron 18 and runs on cable guide rollers 25. Each end of first drive cable 39 terminates with a cable coupler 43 (FIG. 7) which is fixed to a different one of the trolleys 26a, b. As is best viewed in FIG. 7, at least one of the ends of first drive cable 39 is connected to its trolley by a cable tensioning spring 29. A central portion of first drive cable 39 is wound around the grooved drum 32. A second drive cable 60 runs on the same guide rollers 25 and extends half way around the curved channel iron 18 but connects those ends of the trolleys 26a, b not linked to first drive cable 39.

The views provided by FIGS. 4 and 9 reveal the details of air valve 34. It is a three-way valve controlled by a vertically movable plunger 56 extending through it having an upper plunger roller 35 and a lower plunger roller 37 at its ends.

FIG. 6 shows an enlarged view of the means of connection between curved channel iron 18, lifting leg bracket 19, and lifting leg 21. Also shown is one of the cable guide rollers 25 which is situated on the exterior cylindrical wall E of the curved channel iron 18. The guide rollers 25 span the vertical dimension of the curved channel iron 18, extending between its top flange A and its bottom flange B.

FIGS. 7 and 8 illustrate the decontamination means including trolley 26a having arms 45 and rollers 47 connected to trolley 26a by guide roller bracket 52. Spray nozzle manifold 27 is mounted upon the trolley 26a by manifold spacer 41. Water supply line 36 is coupled to spray nozzle manifold 27 by manifold coupling 48.

Returning now to FIG. 9, valve actuator 46a is shown mounted on trolley 26a and positioned to engage the rollers 35 and 37 of air valve plunger 56. FIG. 9 depicts the action of valve actuators 46a and b on the air valve plunger 56. Each valve actuator 46a, b has at its end a roller pusher 58a, b capable of depressing the plunger 56 toward the air valve 34 when one of the moving trolleys 26a, b brings its valve actuator 46a, b into contact with plunger roller 35 or 37 on the plunger 56. The pair of trolleys 26a, b distinguished in FIG. 9 as trolleys 26a and 26b, are shown as having their valve actuators 46a, b mounted in different parallel planes. Roller pusher 58a is positioned to engage upper plunger roller 35, while roller pusher 58b is connected to its trolley 26b such that it will engage lower plunger roller 37.

When it is desired to decontaminate the nuclear reactor pressure vessel, the apparatus of this invention is lowered into position by the main crane using support cable 20. The apparatus is positioned such that guide plates 44a and 44b engage vertical guide rods 16a and 16b to prevent rotation of the curved channel iron 18 about its vertical axis. Water supply line 36 is connected to a source of high pressure water which may have, for example, a capacity of 10 to 25 gallons per minute at a pressure of 5,000 to 10,000 psi. A source of compressed air is also connected to air supply line 38. When compressed air is caused to pass through line 38, air motor 30 rotates grooved drum 32 and first drive cable 39, which is kept taut by a cable tensioning spring 29, is moved around the curved channel iron 18 pulling both trolleys 26a, b about the frame on their rollers 47 in the same direction. As the trolleys 26a, b run on the curved channel iron 18, water is ejected from the nozzles 28 which washes down the interior surface 11 of the vessel. The travel of the trolleys 26a, b is controlled by air valve 34 and valve actuators 46a, b.

When either trolley 26a, b reaches air valve 34, its valve actuator 46a, b engages a plunger roller 35 or 37 on plunger 56. The depression (or raising) of the plunger 56, caused by sliding action of either of the roller pushers 58a or b over rollers 35 or 37, alters the flow of compressed air through the valve 34 and, in turn, reverses the direction of rotation of the air motor 30 by alternating the supply of compressed air between lines 42a and 42b.

Air motor 30 is reversible, such that the introduction of compressed air into one port, 62a, results in clockwise rotation and introduction of compressed air into the other, 62b, produces a torque in the opposite direction. The trolleys 26a, b therefore run on the curved channel iron 18 in a reciprocating fashion, each travelling approximately one half the pressure vessel circumference until its valve actuator 46a, b engages a plunger roller 35 or 37 on plunger 56 of the air valve 34 and reverses the travel of the trolleys 26a, b attached to it. The trolleys then continue back half-way around the curved channel iron 18 until the other trolley's actuator 46a, b engages the air valve plunger roller 35 or 37 on plunger 56 and the cycle repeats.

As the trolleys continue to oscillate, the reactor vessel is drained. As the level of water W drops, it carries the decontamination apparatus with it. A limit switch (not shown) may be employed to stop the air motor 30 when the curved channel iron 18 approaches the core shroud.

Since high pressure water is expelled from identical sets of nozzles 28 situated at opposite sides of the curved channel iron, adverse reaction effects are canceled, thereby permitting the apparatus to be of relatively lightweight construction. By means of this apparatus, a reactor pressure vessel may be decontaminated in approximately 1-2 hours as compared with a time of up to 8 hours using conventional washdown procedures. Furthermore, the decontamination is effected uniformly over the internal surface of the vessel from the flange to the top of the core shroud without subjecting a workman to physical stress and a hazardous radioactive environment.

It is believed that the many advantages of this invention will now be apparent to those skilled in the art. It will also be apparent that a number of variations and modifications may be made in this invention without departing from its spirit and scope. In this application, the term "annular frame" is used to connote any ring-like configuration which substantially forms a closed loop with an opening in the center. The present invention, although depicted in FIG. 1 as having a circular frame, is therefore not limited to this preferred embodiment. A frame comprised of four straight members forming a rectangle, for example, would therefore fall within this broad concept of an annular frame. Accordingly, the foregoing description is to be construed as illustrative only, rather than limiting. This invention is limited only by the scope of the following

What is claimed is:

1. A floating nuclear reactor decontamination apparatus for use in a cylindrical nuclear reactor vessel containing water at a level which decreases during shutdown periods, said apparatus for decontaminating an interior cylindrical wall of such vessel as it is exposed by the decreasing water level comprising
   (a) a buoyant annular frame floatable on the water and hence capable of descending with the decreasing water level,
   (b) a plurality of trolleys movable cylically in a reciprocating manner back and forth around the circumference of the annular frame,
   (c) a plurality of water nozzle means on the respective trolleys for directing high-pressure water sprays outwardly against the vessel wall as the annular frame descends,
   (d) said nozzle means being disposed radially outwardly around said annular frame and their respective trolleys being movable with respect to one another in a manner such that reaction forces on said frame from water sprayed from the nozzles are substantially cancelled.

2. Apparatus according to claim 1 wherein said trolleys move around said frame in opposed pairs such that each of said nozzle means is paired with another facing radially outwardly in the opposite direction on the opposite side of the frame so as to substantially cancel the reaction forces of the sprays on the frame.

3. Apparatus according to claim 1 which includes guide means for preventing the annular frame from rotating within the cylindrical vessel.

4. Apparatus according to claim 1 which includes means connected to the frame for retrieving the apparatus from within the vessel.

5. Apparatus according to claim 1 which includes reversible air motor means mounted on the frame and coupled to said trolleys for automatically moving the trolleys cyclically back and forth around the circumference of the frame.

* * * * *